United States Patent
Sobanski et al.

(10) Patent No.: US 11,365,642 B2
(45) Date of Patent: Jun. 21, 2022

(54) VANE SUPPORT SYSTEM WITH SEAL

(71) Applicant: United Technologies Corporation, Farmington, CT (US)

(72) Inventors: Jon E. Sobanski, Glastonbury, CT (US); Howard J. Liles, Newington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 128 days.

(21) Appl. No.: 16/844,625

(22) Filed: Apr. 9, 2020

(65) Prior Publication Data

US 2021/0317748 A1    Oct. 14, 2021

(51) Int. Cl.
  F01D 11/00 (2006.01)
  F01D 9/02 (2006.01)

(52) U.S. Cl.
  CPC .............. F01D 11/005 (2013.01); F01D 9/02 (2013.01)

(58) Field of Classification Search
  CPC ... F01D 9/02; F01D 9/04; F01D 9/042; F01D 11/00; F01D 11/005; F05D 2240/10; F05D 2240/11; F05D 2240/14; F05D 2240/121
  See application file for complete search history.

(56) References Cited

U.S. PATENT DOCUMENTS

| | | | |
|---|---|---|---|
| 7,214,034 B2 * | 5/2007 | Giot | F01D 5/22 416/193 A |
| 7,721,800 B2 * | 5/2010 | Symons | E21B 17/1014 166/212 |
| 8,096,758 B2 * | 1/2012 | Schiavo | F01D 5/147 415/200 |
| 9,546,557 B2 | 1/2017 | Grooms, III et al. | |
| 10,774,665 B2 * | 9/2020 | Greene | F01D 11/005 |
| 2016/0230576 A1 | 8/2016 | Freeman et al. | |
| 2017/0248029 A1 * | 8/2017 | Hafner | F01D 9/041 |
| 2018/0320549 A1 * | 11/2018 | Luschek | F02K 3/06 |
| 2020/0040750 A1 * | 2/2020 | Greene | F01D 11/005 |
| 2020/0072066 A1 | 3/2020 | Thomas et al. | |
| 2020/0392851 A1 * | 12/2020 | Generale | B64D 27/10 |

(Continued)

FOREIGN PATENT DOCUMENTS

| | | |
|---|---|---|
| DE | 102005024696 | 1/2006 |
| EP | 1164252 | 12/2001 |

(Continued)

OTHER PUBLICATIONS

European Search Report for European Patent Application No. 21167668.9 completed Jul. 23, 2021.

*Primary Examiner* — Eldon T Brockman
*Assistant Examiner* — Danielle M. Christensen
(74) *Attorney, Agent, or Firm* — Carlson, Gaskey & Olds, P.C.

(57) ABSTRACT

A gas turbine engine support system includes a vane arc segment, a vane support arc segment piece configured to engage the vane arc segment, and a seal disposed radially between the vane arc segment and the vane support arc segment piece. The seal includes first and second seal sections. The first seal section has a floor wall and first and second side walls that project from the floor wall. The first and second side walls converge to define a disjointed corner. The second seal section nests with the first seal section and seals the disjointed corner.

19 Claims, 6 Drawing Sheets

(56) References Cited

U.S. PATENT DOCUMENTS

2021/0140335 A1\* 5/2021 Farrar ................ F01D 25/12
2021/0207486 A1\* 7/2021 Sadler ................ F01D 25/28

FOREIGN PATENT DOCUMENTS

| EP | 1548234 | 6/2005 |
|----|---------|--------|
| EP | 2366873 | 9/2011 |
| WO | 2013162928 | 10/2013 |
| WO | 2014186166 | 11/2014 |

\* cited by examiner

VANE SUPPORT SYSTEM WITH SEAL

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Airfoils in the turbine section are typically formed of a superalloy and may include thermal barrier coatings to extend temperature resistance. Ceramics, such as ceramic matrix composite ("CMC") materials, are also being considered for airfoils. CMCs have high temperature resistance. Despite this attribute, there are unique challenges to implementing CMCs in airfoils.

SUMMARY

A gas turbine engine support system according to an example of the present disclosure includes a vane arc segment, a vane support arc segment piece configured to engage the vane arc segment, and a seal disposed radially between the vane arc segment and the vane support arc segment piece. The seal includes a first seal section that has a floor wall and first and second side walls that project from the floor wall. The first and second side walls converge to define a disjointed corner, and a second seal section nests with the first seal section and seals the disjointed corner.

In a further embodiment of any of the foregoing embodiments, the second seal section includes a base wall and a corner section projecting from the base wall. The corner section conforms to the disjointed corner.

In a further embodiment of any of the foregoing embodiments, the base wall conforms to the floor wall of the first seal section.

In a further embodiment of any of the foregoing embodiments, the disjointed corner includes a gap, and the second seal section fully covers the gap.

In a further embodiment of any of the foregoing embodiments, the vane arc segment includes an airfoil section having a hollow interior, and the floor wall includes a through-hole that opens to the hollow interior.

In a further embodiment of any of the foregoing embodiments, the through-hole is airfoil-shaped.

In a further embodiment of any of the foregoing embodiments, the side walls project away from the vane arc segment.

In a further embodiment of any of the foregoing embodiments, the vane support arc segment includes a seal slot and at least one of the first and second side walls extends into the seal slot.

In a further embodiment of any of the foregoing embodiments, the vane arc segment includes a platform, and the floor wall conforms to the platform.

In a further embodiment of any of the foregoing embodiments, the first and second side walls have a wall thickness. The disjointed corner includes a gap between edges of the side walls that define a gap size, and the gap size is greater than the wall thickness.

A seal for a gas turbine engine support system according to an example of the present disclosure includes a first seal section that has a floor wall and first and second side walls that project from the floor wall. The first and second side walls converge to define a disjointed corner, and a second seal section nests with the first seal section and seals the disjointed corner.

In a further embodiment of any of the foregoing embodiments, the second seal section includes a base wall and a corner section projecting from the base wall. The corner section conforms to the disjointed corner.

In a further embodiment of any of the foregoing embodiments, the base wall conforms to the floor wall of the first seal section.

In a further embodiment of any of the foregoing embodiments, the disjointed corner includes a gap, and the second seal section fully covers the gap.

In a further embodiment of any of the foregoing embodiments, the floor wall includes a through-hole.

In a further embodiment of any of the foregoing embodiments, the through-hole is airfoil-shaped.

A gas turbine engine support system according to an example of the present disclosure includes an outer case and vane support arc segment pieces that interface with the outer case. Each said vane support arc segment piece defines a radially open socket. Each vane arc segment defines a platform and an airfoil section that extends from the platform. The platform defines a radial flange of complementary geometry to the radially open sockets of the vane support arc segment pieces. The radial flange projects into a corresponding one of the radially open sockets. There are seals disposed radially between the vane arc segments and the vane support arc segment pieces. Each seal includes a first seal section that has a floor wall and side walls that project from the floor wall. The side walls converge to define first and second disjointed corners, and a second seal section nests with the first seal section and seals the first and second disjointed corners.

In a further embodiment of any of the foregoing embodiments, the seal spans first and second adjacent ones of the vane support arc segments.

In a further embodiment of any of the foregoing embodiments, the first disjointed corner is in the first vane support arc segment, and the second disjointed corner is in the second vane support arc segment.

In a further embodiment of any of the foregoing embodiments, each said radially open socket is circumferentially between two of the seals.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
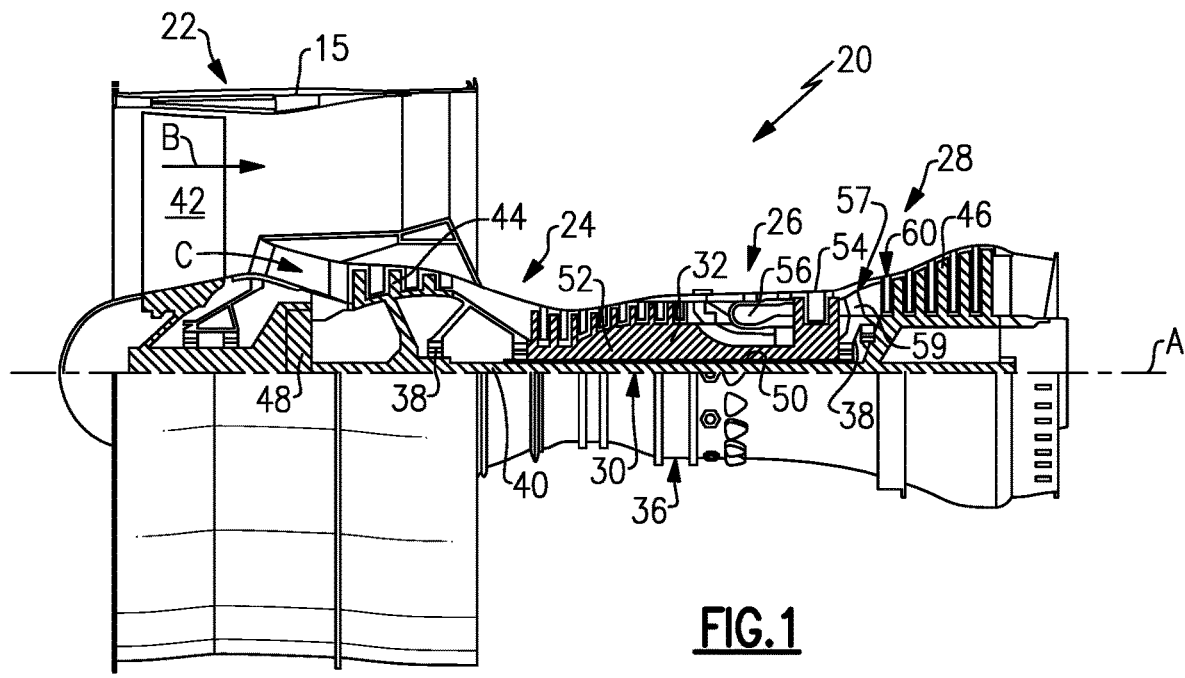
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2:
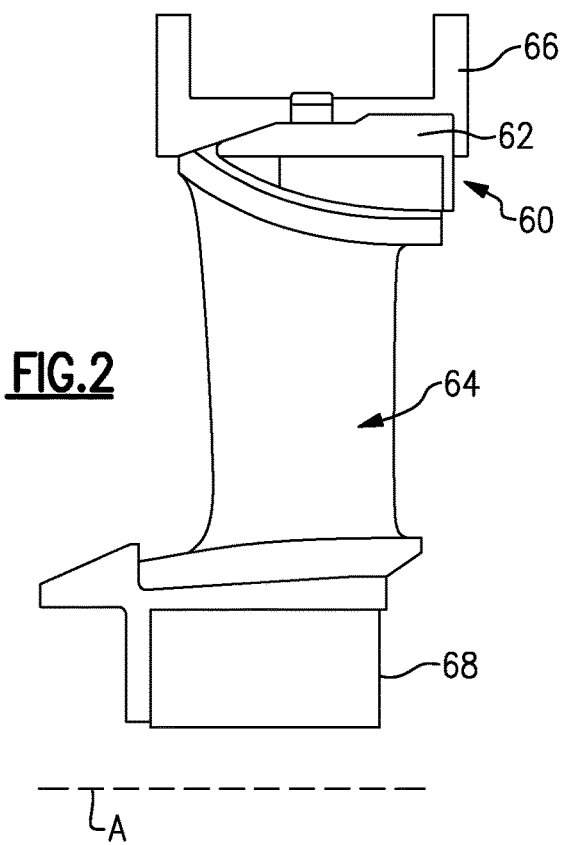
FIG. 2 illustrates a wireframe view of a vane support system.

FIG. 2 illustrates a circumferential, wireframe view of a support system 60 from the turbine section 28 of the engine 20, including a vane support arc segment piece 62, a vane arc segment 64, an outer support structure 66, and an inner support structure 68. Generally, the support system 60 has a ring-strut-ring configuration in which the inner and outer support structures 66/68 serve as support rings and the vane arc segment 64 serves as a strut. The vane support arc segment pieces 62 are situated in a circumferential arrangement in the gas turbine engine 20, between a mating vane arc segment 64 in the core gas path and the adjacent outer support structure 66, such as a case. The vane support arc segment pieces 62 serve to transmit loads from the mating vane arc segment 64 to the outer support structure 66. The vane support arc segment pieces 62 may also serve as a thermal buffer between the vane arc segment 64 and a less thermally tolerant support structure 66. It is also to be appreciated that, although the vane support arc segment pieces 62 in the illustrated example are situated at the radially outer ends of the vane arc segments 64, in alternate embodiments the vane support arc segment pieces 62 may be at the radially inner ends of vane arc segments 64.

Figure 3:
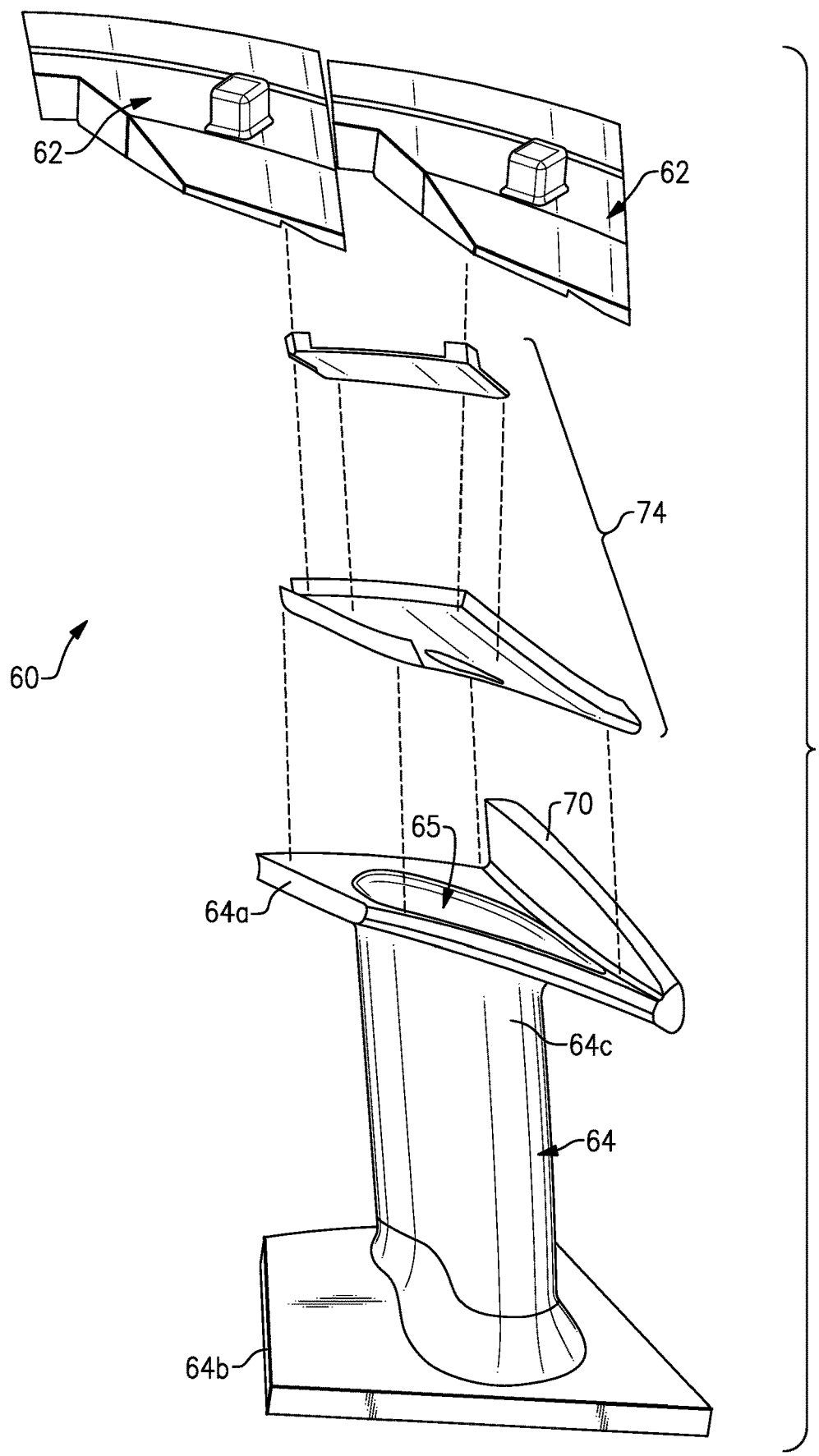
FIG. 3 illustrates an expanded view of portions of a vane support system.
Figure 4:
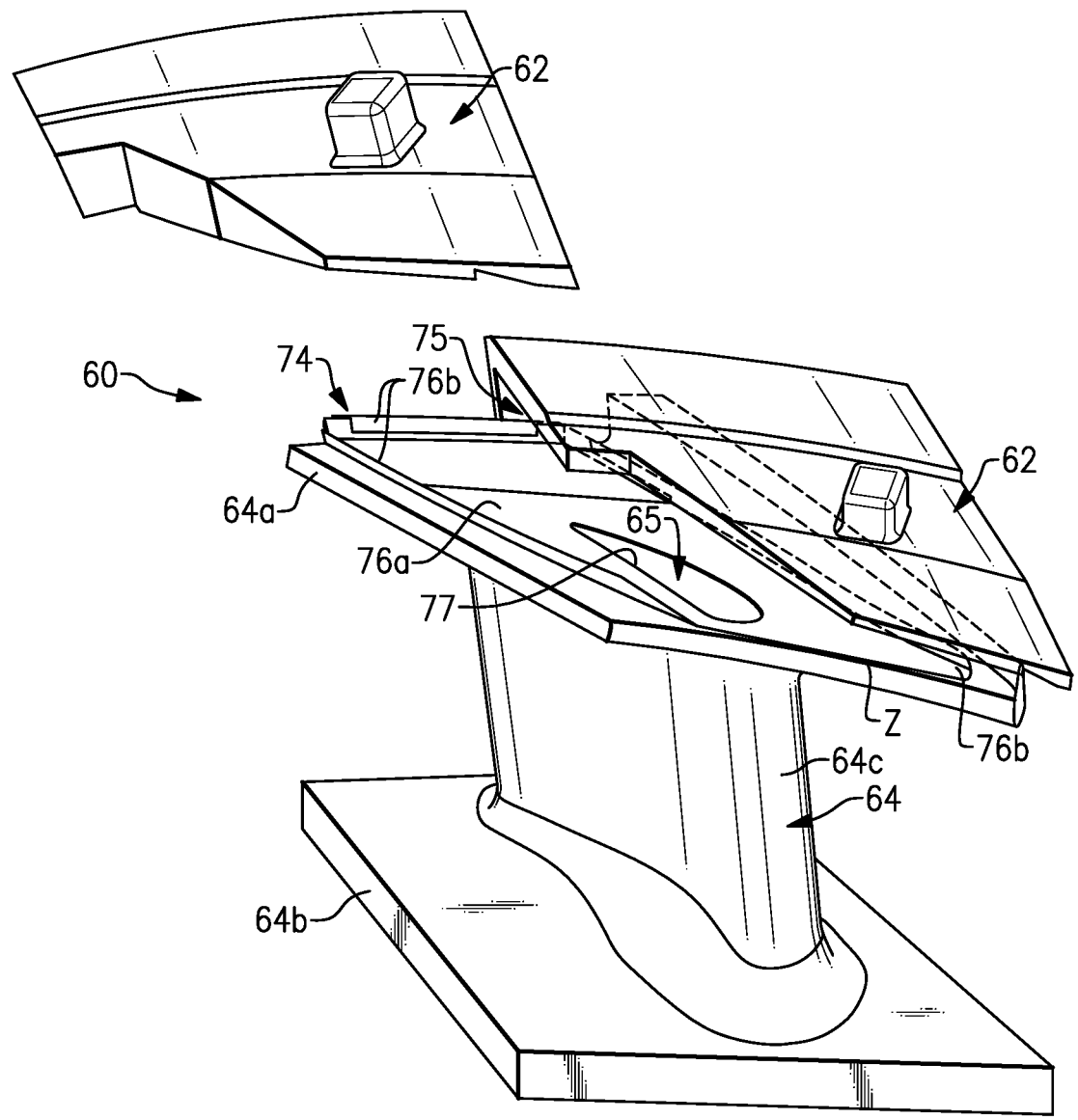
FIG. 4 illustrates an assembled view of a vane support system.

FIG. 3 illustrates an expanded view of a portion of the support system 60, and FIG. 4 illustrates an assembled view. The vane arc segment 64 includes first and second platforms 64a/64b and an airfoil section 64c that extends between the first and second platforms 64a/64b. The airfoil section 64c has a hollow interior 65 and defines a leading end, a trailing end, and pressure and suction sides. In this example, the first platform 64a is a radially outer platform and the second platform 64b is a radially inner platform. The first platform 64a includes a radial flange 70 that projects (radially) from the non-gaspath side thereof. The radial flange 70 is generally elongated in the axial direction.

The vane arc segment 64 is formed of a ceramic material, such as a ceramic matrix composite that has ceramic fibers disposed in a ceramic matrix. The ceramic matrix composite may be, but is not limited to, a SiC/SiC ceramic matrix composite in which SiC fibers are disposed within a SiC matrix.

Figure 5A:
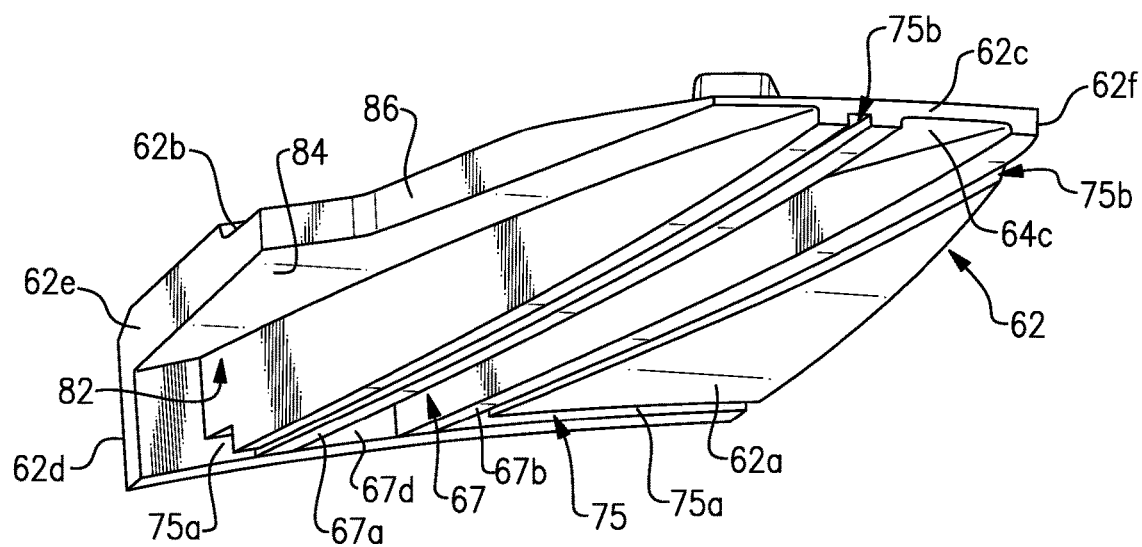
FIG. 5A illustrates a vane support arc segment.
Figure 5B:
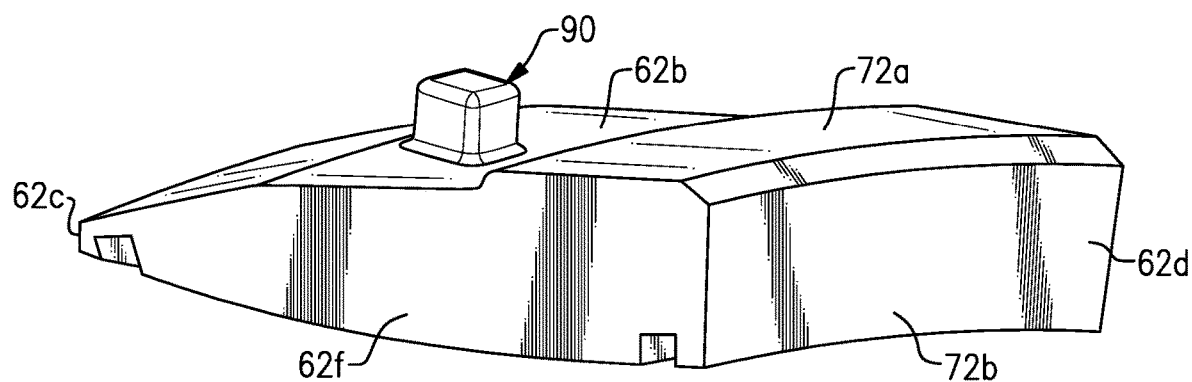
FIG. 5B illustrates another view of the vane support arc segment.

Referring also to isolated views of the vane support arc segment piece 62 in FIGS. 5A and 5B, each vane support arc segment piece 62 defines first and second radial sides 62a/62b, axially forward and aft sides 62c/62d, and first and second circumferential mate face sides 62e/62f. In the illustrated example, the first radial side 62a is an inner radial side and the second radial side 62b is a radially outer side. Alternatively, if the vane support arc segment piece 62 were located at the radially inner end of the vane arc segment 64, the first radial side 62a would be an outer radial side and the second radial side 62b would be a radially inner side.

The first radial side 62a has a radially open socket 67 that is generally elongated in an axial direction (relative to engine axis A). In the illustrated example, the radially open socket 67 extends from the axially forward side 62c to the axially aft side 62d and is curved along its length. It is also contemplated that the radially open socket 67 could extend only a partial length of the full distance between the sides 62c/62d, such as greater than at least 50% of the length. In further examples, the socket 67 is differently curved, straight, faceted, or combinations thereof such that the socket 67 is complementary in geometry to that of a radial flange 70.

The radially open socket 67 is configured by its shape to engage with the radial flange 70 of the vane arc segment 64. In this example, the radially open socket 67 is a slot that has a shape that is defined by opposed circumferential side walls 67a/67b, a floor wall 67c, and an axial wall 67d. As shown, the slot is three-sided, although in alternative examples the socket 67 may exclude one of the side walls 67a/67b depending on load transmission through the radial flange 70. The radial flange 70 is complementary in geometry to that of the radially open socket 67 such that the sides and top of the radial flange portion either contact or closely fit the side walls 67a/67b, floor wall 67c, and the axial wall 67d. Such contact or close fit enables loads to be transmitted from the vane arc segment 64 through the vane support arc segment piece 62 to the support structure 66. In that regard, the vane support arc segment piece 62 also has radial and axial reaction surfaces 72a/72b.

The radial reaction surface 72a is on the second radial side 62b, and the axial reaction surface 72b is on the axially aft side 62d. The radial and axial reaction surfaces 72a/72b are configured, respectively, to transmit radial and axial components of the loads to the support structure 66. For example, the reaction surfaces 72a/72b are relatively large in order to distribute reaction loads, are complimentary in shape with mating surfaces on the support structure 66, and extend from the first circumferential mate face side 62e to the second circumferential mate face side 62f. If further load distribution is required, additional portions of the second radial side 62b may also serve as reaction surfaces.

The vane support arc segment 62 also includes a seal slot 75. The seal slot 75 includes a circumferential leg 75a and axial legs 75b. In this example, one of the axial legs 75b is between the radially open socket 67 and the circumferential mate face side 62e, and the other axial leg 75b is between the radially open socket 67 and the circumferential mate face side 62f.

The vane support arc segment piece 62 further defines a manifold region 82. The manifold region 82 is delimited by the axial wall 67d, the side wall 67a, and radial wall 84 (which also forms the floor wall 67c). There is at least one opening 86 that connects the first radial side 62b with the manifold region 82. The perimeter of the opening 86 is defined, in part, by the radial wall 86, and the remaining perimeter of the opening 86 is defined by the circumferential mate face side 62f of the neighboring vane support arc segment piece 62. In this regard, cooling air, such as bleed air from the compressor section 24, can be provided to the first radial side 62b, flow through the opening 86 into the manifold region 82, and flow from the manifold region 82 into the hollow interior 65 of the airfoil section 64c. The airfoil section 64c may use the cooling air for cooling and/or guide the cooling air on to a downstream passage to another component for cooling.

Optionally, the second radial side 62b has an anti-rotation lock 90. In this example, the lock 90 is a protrusion that is substantially rectangular in cross-section in order to distribute loads. The lock 90 engages with the outer support structure 66 to limit rotational (circumferential) movement of the vane support arc segment piece 62.

During operation of the engine 20, loads on the vane arc segments 64, such as aerodynamic loads, are transmitted from the radial flange 70 to the vane support arc segment pieces 62 via the radially open sockets 67. For example, the radial component of the loads are received into the vane support arc segment piece 62 through the floor wall 67c of the socket 67, and the axial component of the loads are received into the vane support arc segment piece 62 via through the axial wall 67d of the socket 67. The support arc segment piece 62 then transmits the radial loads through the radial reaction surface 72a to the support structure 66 and transmits the axial loads through the axial reaction surface 72b to the support structure 66. The side walls 67a/67b facilitate constraining the radial flange 70, such as constraining circumferential movement. In that regard, in modified examples the side wall 74a may be excluded or, of the load direction is reverse, the side wall 67b may be excluded.

The vane support arc segment piece 62 may also serve as a thermal buffer. For example, ceramic vane arc segments 64 may operate at very high temperatures. The vane support arc segment piece 62 may be formed of a single crystal alloy, which enables the vane support arc segment piece 62 to maintain high strength at high exposure temperatures while also shielding the support structure 66 from the high temperatures. Alternatively, if stresses are relatively low, the vane support arc segment piece 62 may be formed of a ceramic material, such as a ceramic matrix composite. Moreover, since the vane support arc segment piece 62 is in essence sandwiched between the vane arc segment 64 and the support structure 66 rather than being rigidly affixed, the vane support arc segment piece 62 facilitates reducing thermal constraints that may otherwise induce higher stresses.

Figure 6:
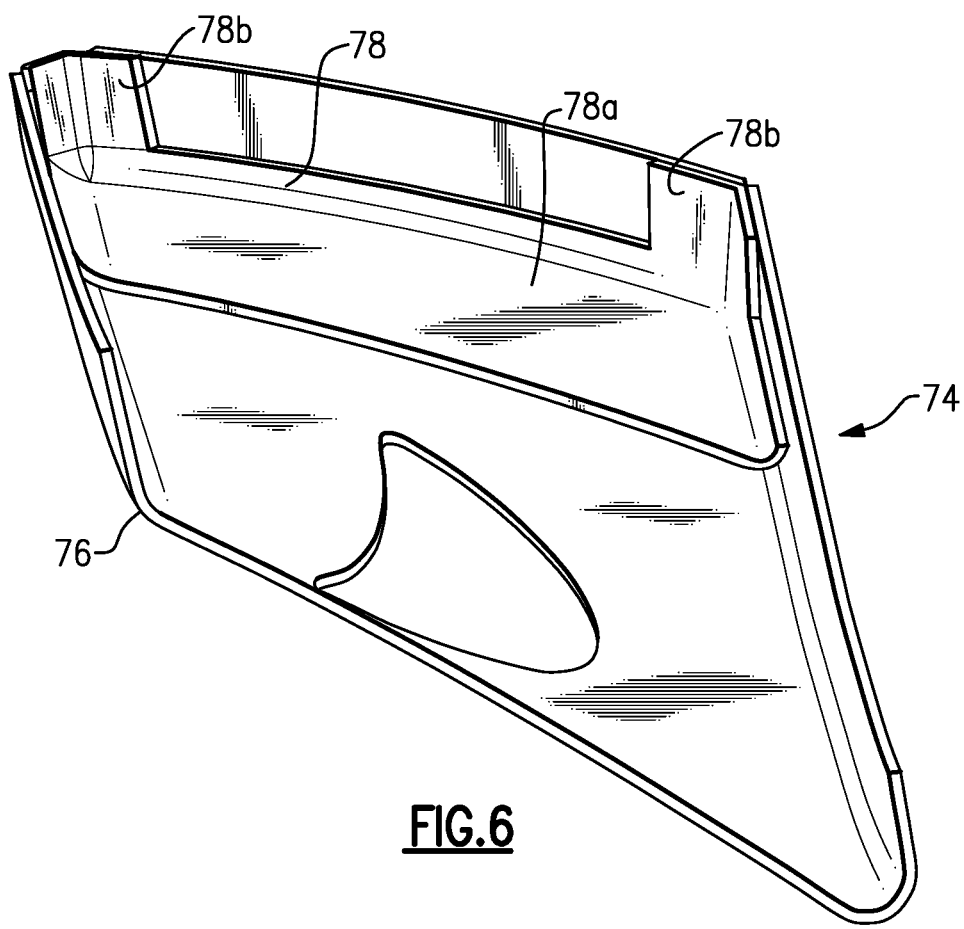
FIG. 6 illustrates a seal.

Referring again to FIGS. 3 and 4, there is also a seal 74 disposed radially between the vane arc segment 64 and the vane support arc segment piece 62. FIG. 6 shows an isolated view of the seal 74. The seal 74 includes a first seal section 76 and a second seal section 78 that nests with the first seal section 76. The term "nests" refers to the second seal section 78 fitting closely in the first seal section 76, for example by conformance of the geometries of the first and second seal sections 76/78.

Figure 7A:
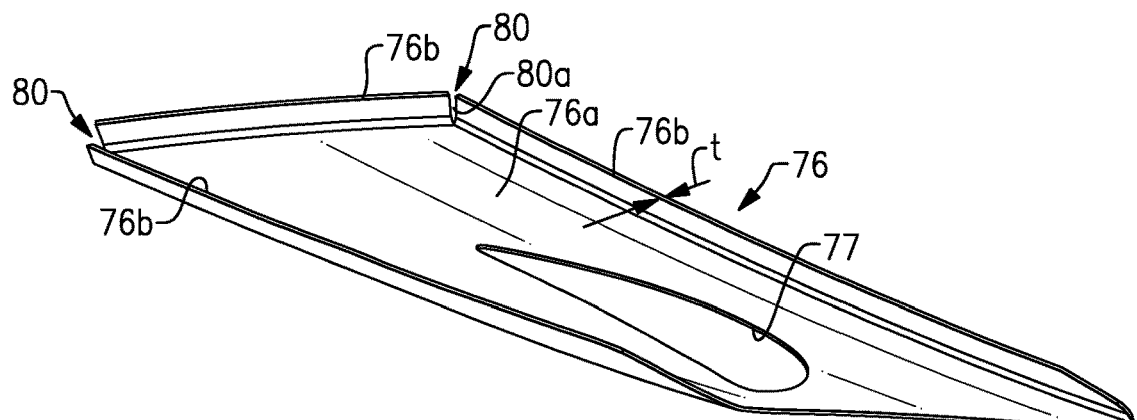
FIG. 7A illustrates an isolated view of a first seal section of the seal.
Figure 7B:
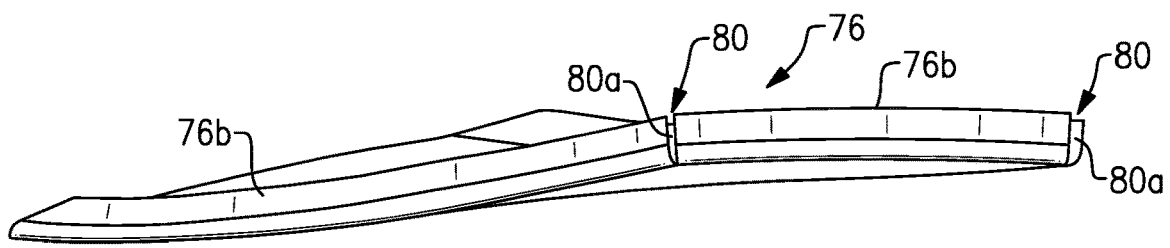
FIG. 7B illustrates another view of the first seal section.
Figure 7C:
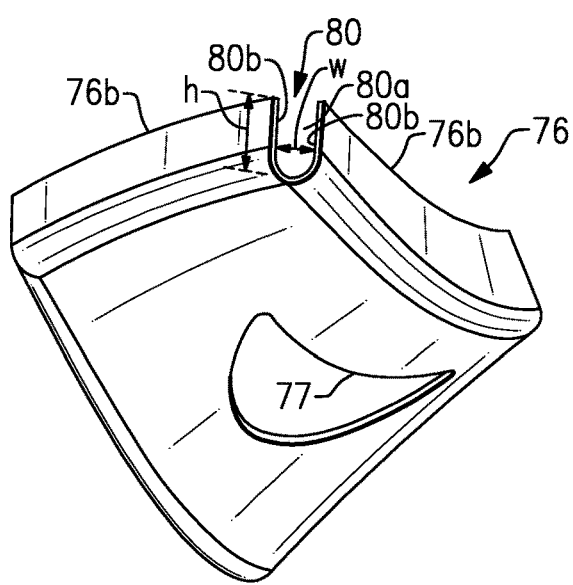
FIG. 7C illustrates another view of the first seal section.

FIGS. 7A, 7B, and 7C illustrate isolated views of the first seal section 76. The first seal section 76 has a floor wall 76a and side walls 76b that project from the floor wall 76a, away from the vane arc segment 64. The floor wall 76a includes a through-hole 77. In the installed position the through-hole 77 sits adjacent the hollow interior 65 of the airfoil section 64c. In this example, the through-hole 77 has an airfoil shape that corresponds to the airfoil shape of the airfoil section 64c.

Adjacent ones of the side walls 76b may be considered to be first and second side walls 76b. In the illustrated example, the first seal section 76 has three side walls 76b but may alternatively have fewer or additional side walls 76b. The side walls 76b converge to define one or more disjointed corners 80 (two in this example). The side walls 76b extend into the seal slot 75 in the vane support arc segment piece 62. As shown in FIGS. 3 and 4, the seal 74 spans between two adjacent vane support arc segment pieces 62 such that a portion of the side walls 76b are disposed in the portion of the seal slot 75 to one side of the radially open socket 67 and another portion of the side walls 76b are disposed in the portion of the seal slot 75 to the other side of the radially open socket 67 in the next adjacent vane support arc segment piece 62. Thus, each seal 74 spans two vane support arc segment pieces 62.

The cooling air is fed into the hollow interior 65 of the airfoil section 64c. The first seal section 76 facilitates preventing the cooling air from leaking and escaping. For instance, the floor wall 76a conforms to the radially outer side of the platform 64a (as indicated at Z in FIG. 4), and the side walls 76b conform against the sides of the seal slot 75. The pressure of the cooling air facilitates pushing the floor wall 76a against the radially outer side of the platform 64a and the side walls 76b against the sides of the seal slot 75.

The disjointed corners 80 in the first seal section 76 are the regions at which the side walls 76b would meet but for gaps 80a between opposed edges 80b of the side walls 76b (FIG. 7C). The side walls 76b are, therefore, not directly connected to each other. Each gap 80a defines a width (w) between the opposed edges 80b and a height (h) from the bottom to the top of the gap 80a. In general, the size of the gap 80a in terms of the width (w) is greater than the wall thickness (t) of the side walls 76b.

The disjointed corners 80 facilitate enhancing the compliance of each side wall 76b, since each side wall 76b is able to flex without constraint from the adjacent side wall 76b. In turn, the enhanced compliance facilitates conformance of the side walls 76b against the sides of the seal slot 75 to provide good sealing. In the illustrated example, in the length direction (i.e., radial direction), the gap 80a ends at the floor wall 76a. However, in modified examples, the gap 80a can be extended into the floor wall 76a to facilitate additional compliance.

Figure 8:
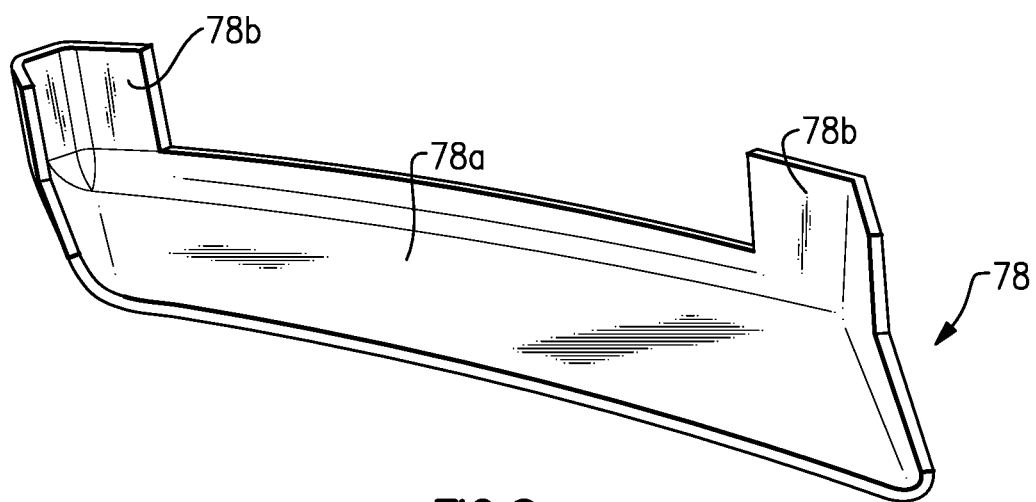
FIG. 8 illustrates an isolated view of a second seal section of the seal.

The gaps 80a, however, may provide a leak path. In this regard, the second seal section 78 nests with the first seal section 76 and seals the disjointed corners 80. FIG. 8 illustrates an isolated view of the second seal section 78. The second seal section 78 includes a base wall 78a and one or more corner sections 78b (two in this example) that project from the base wall 78a. In order to nest, the base wall 78a conforms or substantially conforms to the floor wall 76a of the first seal section 76, and the corner sections 78b conform or substantially conform to the disjointed corners 80. The corner sections 78b cover the gaps 80a to close off the gaps 80a as leak paths. For example, each corner section 78b spans entirely across the width (w) and height (h) of the gap 80a. The pressure of the cooling air biases the second seal section 78 against the first seal section 76, to maintain the nested position. It is to be appreciated that although the seal 74 has two disjointed corners 80 and two corner sections 78 (i.e., two groups of corners 80 and corner section 78) that nest with and seal the disjointed corners 80, that in alternate examples the seal 74 may have a single group with one corner 80 and one corner section 78 or more than two groups of disjointed corners 80 and corner sections 78, such as three or four groups.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine support system comprising:
    a vane arc segment;
    a vane support arc segment piece configured to engage the vane arc segment; and
    a seal disposed radially between the vane arc segment and the vane support arc segment piece, the seal including
        a first seal section having a floor wall and first and second side walls projecting from the floor wall, the first and second side walls converging to define a disjointed corner, and
        a second seal section nesting with the first seal section and sealing the disjointed corner.

2. The system as recited in claim 1, wherein the second seal section includes a base wall and a corner section projecting from the base wall, the corner section conforming to the disjointed corner.

3. The system as recited in claim 2, wherein the base wall conforms to the floor wall of the first seal section.

4. The system as recited in claim 2, wherein the disjointed corner includes a gap, and the second seal section fully covers the gap.

5. The system as recited in claim 1, wherein the vane arc segment includes an airfoil section having a hollow interior, and the floor wall includes a through-hole that opens to the hollow interior.

6. The system as recited in claim 5, wherein the through-hole is airfoil-shaped.

7. The system as recited in claim 1, wherein the side walls project away from the vane arc segment.

8. The system as recited in claim 1, wherein the vane support arc segment includes a seal slot and at least one of the first and second side walls extends into the seal slot.

9. The system as recited in claim 8, wherein the vane arc segment includes a platform, and the floor wall conforms to the platform.

10. The system as recited in claim 1, wherein the first and second side walls have a wall thickness, the disjointed corner includes a gap between edges of the side walls that define a gap size, and the gap size is greater than the wall thickness.

11. A seal for a gas turbine engine support system, the seal comprising:
a first seal section having a floor wall that includes a through-hole and first and second side walls projecting from the floor wall, the first and second side walls converging to define a disjointed corner, and
a second seal section nesting with the first seal section and sealing the disjointed corner.

12. The seal as recited in claim 11, wherein the second seal section includes a base wall and a corner section projecting from the base wall, the corner section conforming to the disjointed corner.

13. The seal as recited in claim 12, wherein the base wall conforms to the floor wall of the first seal section.

14. The seal as recited in claim 12, wherein the disjointed corner includes a gap, and the second seal section fully covers the gap.

15. The seal as recited in claim 11, wherein the through-hole is airfoil-shaped.

16. A gas turbine engine support system comprising:
an outer case;
vane support arc segment pieces interfacing with the outer case, each said vane support arc segment piece defining a radially open socket;
vane arc segments, each said vane arc segment defining a platform and an airfoil section extending from the platform, the platform defining a radial flange of complementary geometry to the radially open sockets of the vane support arc segment pieces, the radial flange projecting into a corresponding one of the radially open sockets; and
seals disposed radially between the vane arc segments and the vane support arc segment pieces, each said seal including a first seal section having a floor wall and side walls projecting from the floor wall, the side walls converging to define first and second disjointed corners, and a second seal section nesting with the first seal section and sealing the first and second disjointed corners.

17. The system as recited in claim 16, wherein the seal spans first and second adjacent ones of the vane support arc segments.

18. The system as recited in claim 17, wherein the first disjointed corner is in the first vane support arc segment, and the second disjointed corner is in the second vane support arc segment.

19. The system as recited in claim 18, wherein each said radially open socket is circumferentially between two of the seals.

* * * * *